Sept. 26, 1939.   B. S. AIKMAN   2,174,395
BRAKE MECHANISM
Filed April 14, 1938   2 Sheets-Sheet 1

INVENTOR
BURTON S. AIKMAN
BY
ATTORNEY

Sept. 26, 1939.  B. S. AIKMAN  2,174,395
BRAKE MECHANISM
Filed April 14, 1938  2 Sheets-Sheet 2

Fig.2.

INVENTOR
BURTON S. AIKMAN
BY
ATTORNEY

Patented Sept. 26, 1939

2,174,395

UNITED STATES PATENT OFFICE 2,174,395

BRAKE MECHANISM

Burton S. Aikman, Wilkinsburg, Pa., assignor to The Westinghouse Air Brake Company, Wilmerding, Pa., a corporation of Pennsylvania Application April 14, 1938, Serial No. 201,866

46 Claims. (Cl. 188—153)

This invention relates to vehicle brakes and more particularly to disk type of brake mechanism for use on railway vehicle trucks.

Vehicle trucks of the type employed under railway vehicles present many difficulties to the installation and maintenance of brake mechanism of the disk type embodying rotatable and non-rotatable friction disks which are adapted to be pressed into frictional engagement for effecting braking of the vehicle wheels.

As will be evident, the most likely location for disk brake mechanisms on railway vehicle trucks is between the wheels of the wheel and axle assemblies. The wheels of such assemblies are however usually pressed on to or otherwise rigidly secured to the axles and it will therefore be evident that this location for a disk brake mechanism requires either dismantling of a truck to install or repair such a mechanism or the design of a special mechanism which can be installed or repaired without dismantling of the truck. In either case it is evident that a pit over which the truck can be placed is essential for both installation and maintenance work.

Further, the installation of disk brake mechanism between the wheels of vehicle trucks is definitely limited to trucks having the necessary space around the axles between the wheels, and such space is not available on certain trucks such as motor trucks on which the propulsion motors for the vehicle are either directly mounted on or connected through suitable gearing or the like to the axles. It will therefore be evident that the adaptability of disk brake mechanisms to locations such as above described is limited, and where such installations are possible, undesirable difficulties are presented with respect to design, installation and maintenance.

One object of the present invention is to provide an improved disk brake mechanism for railway vehicle trucks in which the above difficulties are completely obviated.

According to this object there is provided an improved disk brake mechanism which is adapted to be mounted on either one or both of the ends of a truck axle outside of the wheel and journal box. In this location the brake mechanism may be readily mounted on the axle and disassembled for inspection and repairs without dismantling any part of the truck and without the use of a pit or the like, and complications of design incident to the mounting of such a mechanism between the wheels of a truck are avoided. Further, the improved mechanism is adapted for use on all truck axles even including the power axles of a vehicle and in no way interferes with any other part of the truck.

A major problem in braking a vehicle is to dissipate the heat created between the braking elements during their frictional braking contact in order to prevent excessive disintegration of the braking elements and also to maintain a more favorable frictional characteristic for braking.

Another object of the invention is therefore to provide a disk brake mechanism having improved means for dissipating the heat incident to braking so as to thereby avoid obtaining excessive disintegration of the braking elements and unfavorable frictional characteristics during braking.

This object is attained by so arranging the braking disks on the end of the axle that air currents incident to movement of the vehicle will pass through the mechanism. Air scoops are provided for increasing this circulation of air through the mechanism and there is also provided a novel design of rotatable element through which air forced into the mechanism is adapted to flow for effecting further dissipation of heat from the elements and thereby effective and efficient cooling of the mechanism.

The improved disk brake mechanism comprises a plurality of interleaved rotatable and non-rotatable friction brake elements and a single fluid pressure operative piston for moving all of these elements into frictional braking contact. Each of the rotatable elements is provided with an annular groove the depth of which equals substantially the width of the oppositely arranged braking faces of the element. These grooves therefore, in effect, divide up the pile of braking elements into a plurality of spaced sets of elements, each set embodying one non-rotatable element and a rotatable element at each of the opposite sides of the non-rotatable element. Air is adapted to flow through the annular groove in the rotatable elements at all times and during braking, each of the sets of elements is therefore adapted to be cooled substantially independently of every other set. This construction therefore permits the use of a pile of elements consisting of a number of interleaved and interengaging rotatable and non-rotatable elements which would otherwise be impracticable due to the large amount of heat which must be dissipated from the braking elements during braking, for reasons above described.

Other objects and advantages will be apparent from the following more detailed description of the invention.

In the accompanying drawings.

The disk brake mechanism embodying the invention is associated with a vehicle truck which for the purpose of illustration may comprise side frames 10 having the usual depending pedestals 11 between which there is slidably mounted journal boxes 12. One end of an axle 13 is journaled in each of the journal boxes on roller bearings 14, and rigidly secured to axles 13 in the usual spaced relation and in any desired manner are wheels 15 adapted to roll on track rails 16. A spring 10' carried by each journal box bears against the side frames 10 for resiliently supporting the truck frame.

Only a portion of the truck elements above described are shown in the drawings. The construction of railway vehicle trucks is so well known however, that a more complete showing is not deemed essential to a comprehensive understanding of the invention.

According to the invention, the end of axle 13 is extended beyond the outer face of journal box 12, a portion 17 of the extension being cylindrical in form, while the end portion 18 of the axle is tapered.

A rotor 20 is rigidly secured to the tapered portion 18 of axle 13 by a nut 21 having screw-threaded engagement with the end of said axle, and a key 22 is provided between said axle and rotor for turning said rotor with said axle.

Figures 1, 3:
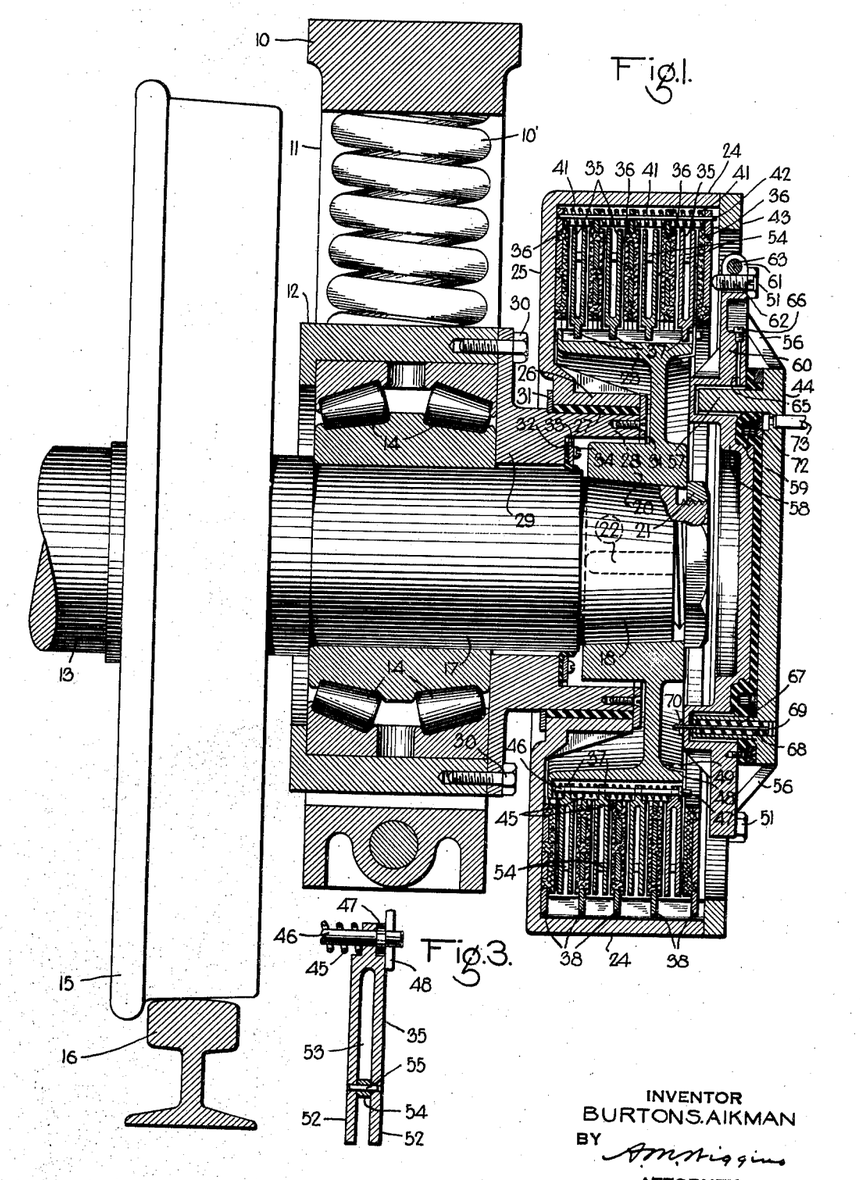
Fig. 1 is a transverse view, mainly in section, of a portion of a vehicle truck and a disk brake mechanism embodying the invention.
Fig. 3 is an enlarged, sectional view of a portion of certain elements embodied in the disk brake mechanism.
Figure 2:
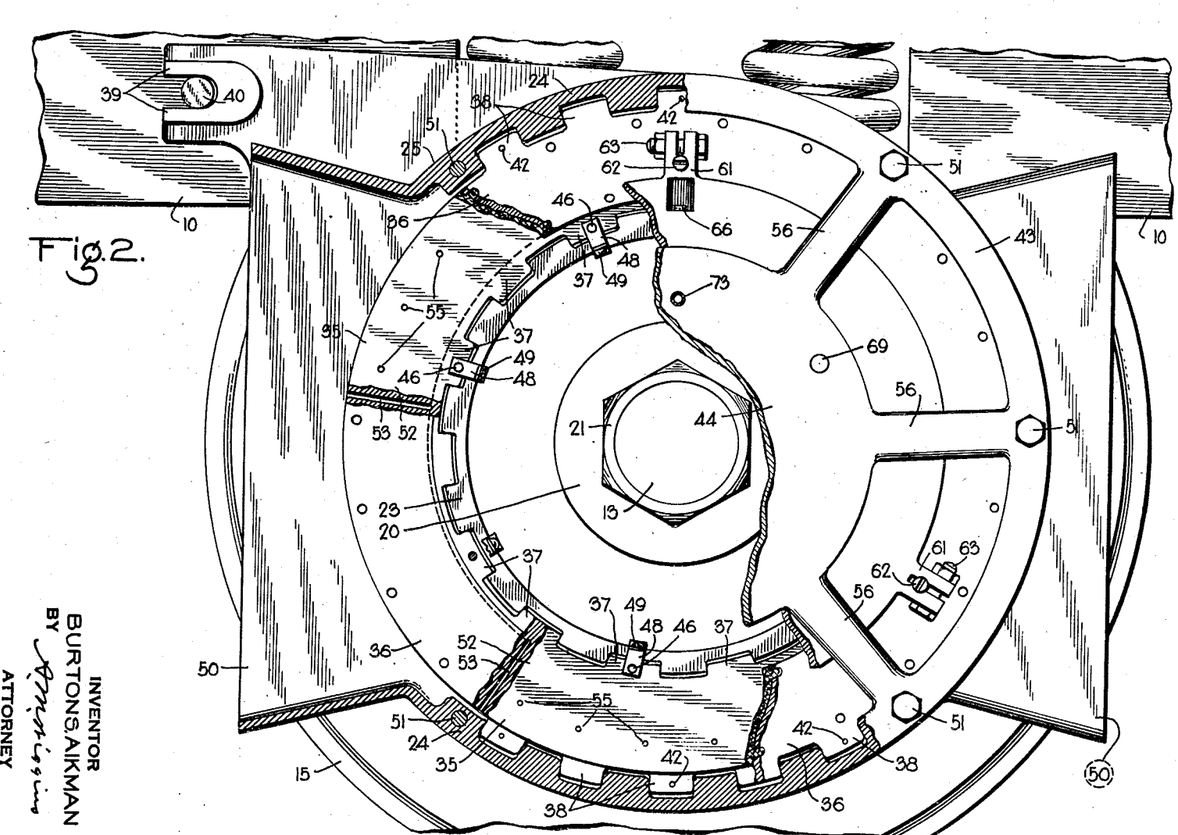
Fig. 2 is a side elevational view of a portion of a truck and the improved disk brake mechanism with certain parts of said mechanism broken away to clearly show internal construction.

The rotor is provided with a cylindrical peripheral portion 23 and is contained in a housing 25 provided above and below said rotor with concentric arcuate shaped portions 24 between the adjacent ends of which said housing is provided with oppositely disposed air conducting passages 50 open to the outside of the housing. One of the passages 50 is open towards one end of the truck while the other is open towards the opposite end of the truck whereby upon movement of the truck in either direction, air is adapted to flow in one of the passages, through the housing 25 and then out of the other passage 50. Either one of the passages 50 may be the inlet passage, while the other will be the outlet passage, depending upon the direction of movement of the truck. The top and bottom walls of passages 50 flare outwardly as shown in Fig. 2 so as to thereby provide, in effect, an air scoop for increasing the amount of air flow though the housing during movement of the truck.

The housing 25 is provided, concentric with the arcuate portions 24, with an annular bearing portion 26 resiliently supported on a bushing 27 made of rubber or the like, and said bushing is carried on a hub 28 which projects from a support member 29 encircling the portion 17 of the axle and secured to the journal box 12 by screws 30.

A ring 31 is disposed between the inner end of bushing 26 and a shoulder formed on the hub 28 for engagement which the adjacent end of the bearing portion 26 of the disk housing 25, while secured to the end of said hub is a ring 31' adapted to engage the opposite end of bearing portion 26 of housing 25. The housing 25 is thereby secured between the rings 31 and 31' and being mounted on the rubber bushing 27 is resiliently supported from the journal box 12 and becomes in effect a sprung portion of the truck.

The housing 25 is provided adjacent the side frame 10 with an outwardly extending arm in the end of which there is provided a jaw 39 which fits over a pin 40 projecting from said frame, whereby said housing is adapted to be held against rotation. Due to this connection between the housing 25 and side frame 10, the housing 25 will be caused to rock relative to hub 28 upon vertical movement of said frame with respect to the wheel 15. Such rocking movement will however be slight and will be permitted due to the resiliency of bushing 27.

An annular ring like gasket 32 encircling and engaging the portion 17 of axle 13 and secured to the support member 29 by a ring 33 and screws 34 is provided for preventing metal dust incident to braking, or other foreign material from escaping from housing 25 along the axle to the journal box 12.

Interposed in the space between the peripheral portion 23 of rotor 20 and the arcuate portions 24 of the housing 25 and encircling said rotor are a plurality of alternately arranged or interleaved annular ring like rotatable braking elements or friction disks 35 and non-rotatable braking elements or friction disks 36. Each of the end elements of the pile are non-rotatable elements 36.

Each of the rotatable elements 35 is provided with a plurality of spaced teeth 37 projecting from its inner peripheral edge and slidably mounted in slots or grooves provided in the peripheral portion 23 of rotor 20, while each of the non-rotatable elements 36 is provided on the portions adjacent the arcuate portions 24 of the housing 25 with a plurality of spaced teeth 38 projecting outwardly and slidably mounted in slots or grooves provided in said arcuate portions of the housing. The rotatable elements 35 are thereby secured to rotor 20 to rotate with wheel 15, while the non-rotatable elements 36 are secured to housing 25 and held against rotation.

In, preferably, every other slot in the arcuate portions 24 in the housing 25 there is disposed between each pair of adjacent teeth 38 on the non-rotatable elements 36 a spring 41 acting to force said elements apart. A pin 42 is provided in each slot containing springs 41 and extends through said springs and suitable openings in the teeth 38 for holding said springs in operative alignment with said teeth. The pins 42 are held in place by an annular rim portion 43 of a cover 44 which will be later described, said rim being secured to the outer end of housing 25 by screws 51.

The inner end of at least every other slot in the periphery of the rotor 20 is closed and disposed in each of these slots between each pair of teeth 37 projecting from the rotatable elements 35 and between the innermost of said teeth and the closed end of said slot, is a spring 45, the several springs 45 acting to move said elements apart. Extending through all of the springs 45 in each slot and through suitable openings in the teeth 37 is a pin 46 for holding the springs 45 in position. Each of the pins 46 is provided adjacent its outer end with an annular collar 47 and over the portion of each pin outside of said collar is fitted one end of a clip 48 the other end of which is secured to rotor 20 by a screw 49. The clips 48 are provided to hold pins 46 in place.

Each of the non-rotatable elements 36 preferably comprises a metal backing plate on which the teeth 38 are provided, and which is covered on one or both faces with any suitable braking material such as metallic or fibrous, it being noted that each of the end non-rotatable plates is provided with braking material on one face only which each of the non-rotatable plates disposed between two rotatable elements 35 is provided with braking material on both of its opposite faces.

Each of the rotatable elements 35 is preferably made in one piece in the form of an annular ring like disk having oppositely disposed continuous or unbroken friction braking faces 52. Between the faces 52 there is provided an annular groove or slot 53 open at the outer peripheral edge of the element and having a depth substantially equal to the width of the braking faces 52. This groove 53 in effect forms two braking disks connected together only adjacent their inner peripheral edges, and interposed in said groove between these disks and engaging the adjacent faces of both disks are a plurality of spaced struts or supports 54. These struts 54 act to support the parts of the disk against collapse when the adjacent non-rotatable elements 36 are forced against the braking faces 52, as will be later described, and are preferable in the form of sleeves held in place by pins 55 secured in the adjacent portions of the disk.

It will be noted that the annular grooves 53 in the rotatable elements 35 extend in a direction parallel to the direction of air flow between the air conducting passages 50 at the opposite ends of housing 25 so that air entering either one of said passages is adapted to flow directly into and through said grooves.

The cover 44 hereinbefore mentioned is supported by the annular ring or rim 43 through the medium of a plurality of spaced connecting arms 56. A cylinder 57 in concentric or axial relation to axle 13 projects from the inner face of the cover 44 and disposed to move in said cylinder is a piston 58 which is preferably provided with an annular packing cup 59 having sliding contact with the cylindrical wall of the cylinder. The piston 58 has at one side a chamber 72 connected to a pipe 73 through which fluid under pressure is adapted to be supplied to and released from said chamber for effecting an application and a release of the brakes, respectively, in a manner to be hereinafter described. The opposite side of piston 58 is subject at all times to substantially atmospheric pressure in the housing 25.

The inner end of the cylinder 57 is open and the piston 58 is provided with an annular portion 60 which extends around said inner end of said cylinder and projecting radially from the outer edge of said annular portion are a plurality of equally spaced split arms 61 the ends of which are spaced from the outermost non-rotatable element 36. A set screw 62 is provided in the end of each arm 61 for engagement with the outer face of the outermost non-rotatable element 36 substantially midway between the inner and outer peripherial edges thereof. A draw bolt 63 is provided through the two parts of each of the arms 61 for clamping said parts against the set screw 62 to hold said set screw in an adjusted position.

Extending lengthwise through the wall of cylinder 57 are a plurality of equally spaced bores in each of which there is provided a piston release spring 67. The outer end of each of these bores is open while the inner end is sufficiently closed to support the inner end of the respective spring 67. In each of these bores there is disposed a plunger 68 having on its outer end a head 69 for engaging the outer end of the respective spring 67, and said plunger extends through said spring, an opening in the inner end wall of the bore and through a suitable bore in the annular portion 60 of the piston 58. At the left hand face of the portion 60 of piston 58, a pin 70 is secured to the end of each of the plungers 68 for thereby securing the respective spring 67 under pressure between the inner end of the spring bore and the plunger head 69, whereby the several springs are effective to urge the piston 58 in the direction toward the right hand to its brakes released position, as shown in the drawings.

It will be noted that the annular portion 60 of the piston 58 is substantially U-shaped to fit around the inner end of the cylinder 57 and that both inside and outside of said cylinder clearance space is provided between the cylinder and said piston, the clearance space at one side being connected past the end of the cylinder to that at the other side. A lubricant passage 65, the outer end of which is closed by a removable plug 66, is provided through the annular portion 60 of the piston leading to the clearance space between said piston and the outer wall of cylinder 57 and through this passage lubricant may be forced to the piston 58 and packing 59 for effecting lubrication thereof.

The assembling of the brake mechanism to the end of an axle 13 is accomplished in the following manner. First, the support member 29 is secured to the end of the journal box 12 and then the housing 25 is secured in position on said support member. Next the rotor 20 is secured to the end 18 of the axle 13 following which the rotatable and non-rotatable elements 35 and 36 are slipped into place, the springs 41 and 45 being inserted in their proper positions between said plates during this operation. Next the spring retaining rods 42 and 46 are slipped into position and the clips 48 applied to the rotor for holding the pins 46 in the rotor 20. The piston 58 is then slipped into the cylinder 57 and the release springs 67 applied after which the member 44 carrying said cylinder and piston is secured to the casing 25 by bolts 51. In order to disassemble or remove the improved disk brake mechanism from the vehicle truck axle 13 for any reason whatsoever, the above described operations are just reversed.

It will now be evident that the improved disk brake mechanism can be easily applied to and removed from the axle 13 without the use of special tools and no pit or the like need be provided for such operations. It will also be evident that any part of the mechanism can be readily replaced when required due to wear, breakage or the like.

After the disk brake mechanism is assembled on axle 13, the several springs 41 acting on the teeth 38 of the non-rotatable elements 36 force the innermost of said elements against the housing 25 and the outermost of said elements against the set screw 62, while the intermediate elements 36 are equally spaced one from the other and from those at the ends. Likewise, the springs 45 acting on teeth 37 of the rotatable elements 35 force the outermost of said elements against the collars 47 on pins 46, which collars act as stops for the outermost element, and force the other of said elements into substantially equally spaced relation. With the piston 58 pulled to its release position by release springs 67, which position is defined by the engagement of said piston with the end wall of chamber 72, the several set screws 62 are screwed into engagement with the adjacent non-rotatable element 36. The set screws 62 are then operated to shift the outermost non-rotatable element 36 relative to the adjacent rotatable element 35 and through the medium of springs 41 the other non-rotatable elements are shifted relative to the other rotatable elements, and this shifting is continued until the clearance space at both sides of the rotatable elements 35 and the adjacent non-rotatable elements is substantially the same. The lock bolts 63 are then tightened to hold the set screws in their adjusted condition.

Operation

In order to effect operation of the disk brake mechanism to brake the axle 13 and thereby wheel 15, fluid under pressure is supplied to pipe 73 in any desired manner such as, for instance, by the operation of the usual triple valve device or the like employed on railway vehicles.

Fluid under pressure thus supplied to pipe 73 flows into piston chamber 72 and therein acts on piston 58 to effect movement thereof in a direction toward the left hand. This movement of piston 58 acts through the pins 62 on the outermost non-rotatable element 36 and moves said element into engagement with the outermost rotatable element 35. The other non-rotatable and rotatable elements are then successively picked up and moved into engagement with each other until the innermost rotatable element 35 engages the innermost non-rotatable element 36 which is backed up against the housing 25.

After all of the rotatable and non-rotatable elements are thus moved into engagement the pressure of fluid in chamber 72 acting on the piston 58 forces said elements together with pressure whereby the friction between the rotatable elements and non-rotatable elements acts to create a drag on the rotatable elements and thus effect braking thereof and of the connected axle 13 and wheel 15. The degree with which the wheel 15 is thus braked depends upon the pressure with which the non-rotatable elements are pressed against the rotatable elements and may be varied as desired by varying the pressure of fluid in chamber 72 acting on the piston 58.

With the vehicle in motion, a stream of air is forced into the housing 25 through one or the other of the passages 50, according to the direction of travel of the vehicle. This stream of air after entering the housing 25 circulates around and over the various parts of the mechanism as well as through the annular slots 53 in the rotatable elements 35 and then leaves the housing through passage 50 opposite that through which it entered. This continuous stream of air through the housing 25 carries away heat developed between the disk elements incident to braking, and particularly the air flow through the channels 53 in the rotatable elements 35 effects cooling of said elements over substantially the full width of their braking faces thereby not only effectively cooling the rotatable elements but also due to such cooling limiting the heating of the non-rotatable elements to a degree which will avoid excessive disintegration of any of the friction surfaces.

When it is desired to effect a release of the brakes after an application, fluid under pressure is released from pipe 73 and thereby from piston chamber 72. The release springs 67 then return the piston 58 to its release position, and the several release springs 41 and 45 move the non-rotatable elements 36 and rotatable elements 35 to their release position in which they are disengaged from each other, as shown in the drawings.

From the above description it will now be noted that the improved disk brake mechanism can be readily applied to and removed from a vehicle for repairs or the like without special tools or equipment of any type. It is simple in construction and therefore inexpensive to manufacture, and due to the efficient cooling system provided, it is practical for the use intended.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A brake mechanism for a wheel and axle assembly of a vehicle truck having a journal box supported on said axle outside of one of the wheels of the assembly, and having a truck frame supported on the journal box, said mechanism comprising a brake housing removably secured to said journal box at the outer end thereof, annular rotatable and non-rotatable friction braking elements in said housing, the non-rotatable element being secured to said housing against rotation, means removably secured to the end of said axle operatively connected to said rotatable element for turning said rotatable element with said axle, and means carried by said housing for controlling movement of said elements into and out of frictional braking engagement.

2. A brake mechanism for the axle of a vehicle truck having a wheel secured to rotate with said axle and a member supported by said axle outside of said wheel and secured against rotation, said mechanism comprising a brake housing removably secured to said member, annular rotatable and non-rotatable friction braking elements in said housing, the non-rotatable element being secured to said housing against rotation, means removably secured to the end of said axle operatively connected to said rotatable element for turning said rotatable element with said axle, the side of said housing most remote from said wheel being open for inserting and removing said elements to and from said housing and for applying and removing said means to and from the end of said axle, a cover for closing the open end of said housing, and a fluid pressure controlled piston carried by said cover in axial alignment with said axle for controlling movement of said elements into and out of frictional engagement.

3. A brake mechanism for a vehicle truck having a wheel and axle assembly and a member supported by said assembly and secured against rotation, said mechanism comprising a brake housing encircling one end of said assembly and secured to said member against rotation, a plurality of annular non-rotatable friction braking elements encircling the end of said axle and splined to said housing and movable longitudinally of said axle, a plurality of annular rotatable friction braking elements encircling said axle and interleaved with said non-rotatable elements and having a splined connection to said axle for rotation therewith, and a fluid pressure controlled piston disposed axially of said axle and braking elements and operatively connected to said braking elements for moving said braking elements into frictional braking engagement.

4. A brake mechanism for a vehicle truck having a wheel and axle assembly and a journal box supported on one end of said assembly and secured against rotation, said mechanism comprising a brake housing removably secured to said journal box at the outer end thereof, a pile of interleaved rotatable and non-rotatable annular friction braking elements within said housing, the non-rotatable elements having a splined connection with said housing and the rotatable elements being secured to rotate with said axle and being movable longitudinally relative to said axle, and means operatively connected to one end of said pile for moving said braking elements into frictional braking engagement.

5. A brake mechanism for a vehicle truck having a wheel, an axle carried by and secured to rotate with said wheel, and a journal box carried by said axle adjacent the outer face of said wheel, said axle extending beyond the outer face of said journal box, said mechanism comprising a brake housing encircling the end portion of said axle and removably secured to said journal box against rotation, a pile of interleaved rotatable and non-rotatable annular friction braking elements disposed within said housing, said non-rotatable elements having a splined connection with said housing, said rotatable elements having a splined connection with said axle for rotation therewith and capable of movement longitudinally of said axle, and means operatively connected to one end of said pile for effecting movement of said elements into frictional braking engagement.

6. A brake mechanism for a vehicle truck having a wheel, an axle carried by and secured to rotate with said wheel, and a journal box carried by said axle adjacent the outer face of said wheel, said axle extending beyond the outer face of said journal box, said mechanism comprising a brake housing encircling the end portion of said axle and removably secured to said journal box against rotation, a pile of interleaved rotatable and non-rotatable annular friction braking elements disposed within said housing, said non-rotatable elements having a splined connection with said housing, said rotatable elements having a splined connection with said axle for rotation therewith and capable of movement longitudinally of said axle, the outer end of said housing being open for the assembly of said braking elements in their working position, a member secured to said housing over the open end thereof, and a piston carried by said member axially of said axle and operatively connected to one of said pile of elements for controlling movement of said elements into frictional braking engagement.

7. A brake mechanism for a vehicle truck having a wheel, an axle carried by and secured to rotate with said wheel and a member supported on said axle outside said wheel and secured against rotation, said mechanism comprising a housing encircling said axle outside said member and removably secured to said member against rotation, a pile of interleaved rotatable and non-rotatable friction braking elements disposed in said housing, said non-rotatable elements having a splined connection with said housing, means connecting said rotatable elements to said axle for rotation therewith and for movement longitudinally of said axle, the outer end of said housing being open for assembling said elements in said housing in their working position, a member removably secured over the open end of said housing, and means carried by said member and operatively connected to one end of said pile of elements for controlling movement of said elements into frictional braking engagement with each other.

8. A brake mechanism for a vehicle truck having a wheel, an axle carried by and secured to rotate with said wheel and a member supported on said axle outside said wheel and secured against rotation, said mechanism comprising a housing encircling said axle outside said member and removably secured to said member against rotation, a rotor disposed within said housing and removably secured to the end of said axle for rotation with said axle, a pile of interleaved rotatable and non-rotatable friction braking elements disposed in said housing and encircling said rotor, said non-rotatable elements having a splined connection with said housing and said rotatable elements having a splined connection with said rotor, the outer end of said housing being open for assembling said elements and rotor in said housing, a member removably secured over the open end of said housing, and means associated with said member and operatively connected to one end of said pile of elements for controlling movement thereof into frictional braking engagement.

9. A brake mechanism for a vehicle truck having a wheel, an axle carried by and secured to said wheel for rotation therewith, a journal box carried by said axle outside of said wheel, and a truck frame resiliently supported from said journal box, said mechanism comprising a support member encircling said axle outside of said journal box and removably secured to said journal box, a brake housing encircling and disposed in substantial concentric relation with said axle outside of said journal box and resiliently supported by said support member, means connecting said housing to said truck frame for holding said housing against rotation, a pile of interleaved rotatable and non-rotatable annular friction braking elements disposed in said housing, means associated with said housing and connected to said non-rotatable elements for holding same against rotation, means securing said rotatable elements to said axle for rotation therewith, and means associated with said housing and operatively connected to said pile of elements for controlling movement of said elements into frictional braking engagement.

10. A brake mechanism for a vehicle truck having a wheel, an axle carried by and secured to said wheel for rotation therewith, a journal box carried by said axle outside of said wheel, and a truck frame resiliently supported from said journal box, said mechanism comprising a support member encircling said axle outside of said journal box and removably secured to said journal box, and having an outwardly extending cylindrical bearing portion, a resilient bearing sleeve encircling and carried by said bearing portion, a brake housing encircling said axle and sleeve and supported on said sleeve, means securing said housing to said truck frame for holding said housing against rotation, a pile of interleaved annular rotatable and non-rotatable friction braking elements disposed in said housing and encircling said axle, means securing said non-rotatable elements to said housing against rotation, means securing said rotatable elements to rotate with said axle, and means carried by said housing and operatively connected to said pile of elements for controlling movement of said elements into frictional braking engagement.

11. A brake mechanism for a vehicle truck having a wheel, an axle carried by and secured to rotate with said wheel and a member supported on said axle outside of said wheel and secured against rotation, said mechanism comprising a removable brake housing secured over the end of said axle to said member, means for securing said housing against rotation, the outside end of said housing being open, a pile of interleaved annular rotatable and non-rotatable friction braking elements disposed in said housing and adapted to be inserted into and removed from said housing through the open end of said housing, means securing the non-rotatable elements to said housing against rotation, means securing the rotatable elements to said axle for rotation therewith, a member secured over the open end of said housing and having an inwardly extending cylinder in axial alignment with the end of said axle, and a fluid pressure controlled piston disposed to operate in said cylinder and operatively connected to said pile of elements for controlling movement of said elements into frictional braking engagement.

12. A brake mechanism for a vehicle truck having a wheel, an axle carried by and secured to rotate with said wheel and a member supported on said axle outside of said wheel and secured against rotation, said mechanism comprising a removable brake housing secured over the end of said axle to said member, means for securing said housing against rotation, the outside end of said housing being open, a pile of interleaved annular rotatable and non-rotatable friction braking elements disposed in said housing and adapted to be inserted into and removed from said housing through the open end of said housing, means securing the non-rotatable element to said housing against rotation, means securing the rotatable element to said axle for rotation therewith, a member secured over the open end of said housing and having an inwardly extending cylinder in axial alignment with the end of said axle, a fluid pressure controlled piston disposed to operate in said cylinder and operatively connected to said pile of elements for controlling movement of said elements into frictional braking engagement, and a plurality of spaced springs carried by said removable member and connected to said piston for holding said piston in said cylinder and for moving said piston in said cylinder to a position to permit disengagement of said elements.

13. A brake mechanism for the axle of a vehicle truck comprising a rotor secured to the end of said axle for rotation therewith, a brake housing encircling said rotor and secured against rotation, a pile of interleaved rotatable and non-rotatable annular friction braking elements encircling said rotor within said housing and with a non-rotatable element disposed at both the inner and outer ends of said pile and with the inner non-rotatable element engaging said housing, said non-rotatable elements being splined to said housing and capable of movement in a direction longitudinally of said axle, said rotatable elements being splined to said rotor and being capable of movement in a direction longitudinally of said axle, springs acting on said non-rotatable elements for moving same into predetermined spaced relation, springs acting on said rotatable elements for moving same into predetermined spaced relation, a piston carried by said housing and operatively connected to said outer non-rotatable element for controlling movement of said pile of elements into frictional braking engagement with each other, said piston having a position for permitting said springs to move said elements into spaced relation, and adjustable means in the operating connection between said piston and said outer non-rotatable element adapted in said position of said piston to adjust said non-rotatable elements relative to said rotatable elements for providing clearance space between all of said elements.

14. A brake mechanism for a vehicle truck having a wheel, an axle carried by said wheel and a member carried by said axle outside of said wheel and secured against rotation, said mechanism comprising a housing carried by said member and secured against rotation, a pile of annular rotatable and non-rotatable friction braking elements disposed in said housing and encircling said axle, the rotatable element being secured to said axle for rotation therewith, and the non-rotatable element being secured to said housing and thereby held against rotation, means for moving said elements into frictional braking engagement, and means associated with said housing open to the atmosphere in the direction of travel of said vehicle for forcing air currents through said housing over and around said elements for effecting cooling thereof.

15. A brake mehcanism for a vehicle truck having a wheel, an axle carried by said wheel and a member carried by said axle outside of said wheel and secured against rotation, said mechanism comprising a housing carried by said member and secured against rotation, a pile of annular rotatable and non-rotatable friction braking elements disposed in said housing and encircling said axle, the rotatable element being secured to said axle for rotation therewith, and the non-rotatable element being secured to said housing and thereby held against rotation, means for moving said elements into frictional braking engagement, said housing having two oppositely disposed air conducting passages one of which is open towards one end of the truck while the other is open towards the opposite end of the truck and through which passages, upon movement of said truck in either direction, air currents are forced through said housing over and around said elements for effecting cooling thereof.

16. A brake mechanism for a vehicle truck having a wheel, an axle carried by said wheel and a member carried by said axle outside of said wheel and secured against rotation, said mechanism comprising a housing carried by said member and secured against rotation, a pile of annular rotatable and non-rotatable friction braking elements disposed in said housing and encircling said axle, the rotatable element being secured to said axle for rotation therewith, and the non-rotatable element being secured to said housing and thereby held against rotation, means for moving said elements into frictional braking engagement, said housing having two oppositely disposed air conducting passages one of which is open towards one end of the truck and the other of which is open towards the other end of the truck, and one or more of the side walls of the passage which is open to the front of the truck when the truck is in motion being flared outwardly to scoop air from the atmosphere and direct it into said housing over and around said elements for effecting cooling thereof, the air thus directed into said housing escaping through the passage which is open towards the other end of the truck when in motion.

17. A brake mechanism for a vehicle truck having a wheel, an axle carried by said wheel and a member carried by said axle and secured against rotation, said mechanism comprising a housing carried by and encircling said member, said housing having top and bottom arcuate shaped portions concentric with said axle and having between each of the adjacent ends of said portions an air conducting passage open to the atmosphere, one of said passages opening toward one end of the track and the other passage opening toward the other end of the truck, and one or more of the side walls of the passage extending toward the leading end of the truck during movement of the truck, and flaring outwardly for scooping air from the atmosphere for flow through said housing and out of the other passage, an annular rotatable friction braking element disposed in said housing between said passages and secured to rotate with said axle, an annular non-rotatable friction braking element disposed in said housing between said passages in cooperative relation with said rotatable element and secured to said housing against rotation, and means carried by said housing for controlling movement of said braking elements into and out of frictional braking engagement.

18. A brake mechanism for a vehicle truck having a wheel, an axle carried by said wheel and a member carried by said axle and secured against rotation, said mechanism comprising a housing carried by said member, a pair of annular, non-rotatable friction braking elements disposed in said housing and secured to said housing against rotation, an annular, rotatable friction braking element disposed between said non-rotatable elements and secured to rotate with said axle, means for controlling movement of said elements into and out of frictional braking engagement, means for creating a forced circulation of air through said housing in line with the braking faces of said elements for dissipating heat therefrom incident to braking, said rotatable element having an annular air flow passage between the friction faces thereof and parallel to the direction of air through said housing for directing air flow between said friction faces for further dissipating heat from said elements.

19. A brake mechanism for a vehicle truck having a wheel, an axle carried by said wheel and a member carried by said axle and secured against rotation, said mechanism comprising a housing carried by said member, a plurality of annular non-rotatable friction-braking elements disposed in said housing and secured to said housing against rotation, a plurality of annular rotatable friction braking elements in said housing interleaved with said non-rotatable elements and secured to rotate with said axle, said rotatable and non-rotatable elements constituting a single pile of cooperating braking elements, means operative on one end of said pile for effecting movement of said elements into frictional braking engagement, said housing including means for forcing a stream of air against the peripheral edges of said elements and through said housing over and around said elements for dissipating heat from said elements incident to braking, and each of said rotatable elements having an annular air conducting passage between the friction faces thereof and open at the periphery thereof and in line with the direction of air flow through said housing for directing the flow of air between said faces for further dissipating heat from said elements.

20. A brake mechanism for a vehicle truck having a wheel, an axle carried by said wheel and a member carried by said axle and secured against rotation, said mechanism comprising a housing carried by said member, a plurality of annular non-rotatable friction braking elements disposed in said housing and secured to said housing against rotation, a plurality of annular rotatable friction braking elements in said housing interleaved with said non-rotatable elements and secured to rotate with said axle, said rotatable and non-rotatable elements constituting a single pile of cooperating braking elements, means operative on one end of said pile for effecting movement of said elements into frictional braking engagement, said housing including means for forcing a stream of air against the peripheral edges of said elements and through said housing over and around said elements for dissipating heat from said elements incident to braking, and each of said rotatable elements having an annular groove between the oppositely disposed friction braking faces thereof extending into the element from the periphery a distance substantially equal to the width of said surfaces, said groove being in line with the direction of air flow through said housing for directing a stream of air between said faces for further dissipating heat from said elements.

21. An annular friction braking disk having oppositely disposed friction braking faces, and an annular groove open throughout its length and at the peripheral surface of the disk and extending into the disk a distance substantially equal to the width of said braking faces through which a stream of air is adapted to flow from side to side of the disk at opposite sides of the axis for cooling said disk.

22. An annular friction braking disk comprising two spaced disk portions the opposite faces of which are friction braking faces, and means securing said portions to each other in spaced relation providing space between said two portions which is open from side to side of the disk at opposite sides of its axis for the flow of air to dissipate heat from said disk portions.

23. An annular friction braking disk having oppositely disposed friction braking faces and having an annular groove between said faces extending into said disk a depth substantially equal to the width of said faces and which is open from side to side of the disk at opposite sides of its axis and through which groove air is adapted to flow for dissipating heat from said portions, and a plurality of struts disposed in said groove in spaced relation and engaging the portions of said disk at both sides of said groove for supporting said portions against collapse when said faces are subject to braking forces.

24. In a brake mechanism for a wheel and axle assembly of a railway vehicle truck, in combination, a truck frame movable vertically relative to said wheel and axle assembly, a bearing member supported on an end portion of the axle of said assembly and constituting a support for said frame, said bearing member being located at the outer side of one wheel of said assembly, rotatable and non-rotatable friction braking elements located at the outer side of said wheel and movable axially into frictional braking engagement with each other, the rotatable element being secured for rotation with and movable axially of said assembly and the non-rotatable element being 25. In a brake mechanism for a wheel and axle assembly of a railway vehicle truck, in combination, a truck frame which is movable vertically relative to the wheel and axle assembly, a member supported on the axle of said assembly at the outer side of the wheel and resiliently supporting said truck frame, interleaved rotatable and non-rotatable braking disks adapted to interengage for producing braking action on a wheel of said assembly, a supporting structure secured to rotate with a wheel of the assembly for supporting the rotatable disks and providing for axial movement of the rotatable disks, a restraining structure carried by the axle supported member for preventing rotation of the non-rotatable disks and providing for axial movement of the disks, said restraining structure interlocking with said truck frame for maintaining the member against rotation, and a fluid pressure operated device associated with the restraining structure for moving said disks axially into braking engagement.

26. In a brake mechanism for a wheel and axle assembly of a railway vehicle truck, in combination, a truck frame which is movable vertically relative to the wheel and axle assembly, a member supported on the axle of said assembly at the outer side of the wheel and resiliently supporting said truck frame, interleaved rotatable and non-rotatable axially movable braking disks adapted to interengage for producing braking action on a wheel of said assembly, said rotatable disks being secured for rotation with said wheel and said non-rotatable disks being held against rotation by said axle supported member, means for interlocking said axle supported member against rotation, and fluid pressure responsive means for moving said disks into braking engagement.

27. In a brake mechanism for a wheel and axle assembly of a railway vehicle truck, in combination, a journal box on said assembly, a truck frame carried by and movable vertically relative to said journal box and thereby to the wheel and axle assembly, rotatable and non-rotatable braking elements, the rotatable element being secured to rotate with the wheels and movable axially thereof, and the non-rotatable element being secured to the journal box against rotation and movable axially thereof, and a brake cylinder carried by and associated with the journal box and operatively connected to the elements for actuating same.

28. A brake mechanism for a wheel and axle assembly of a vehicle truck having a non-rotatable bearing member supported on the axle outside of a wheel of the assembly and resiliently supporting a truck frame, said mechanism comprising a supporting structure removably secured to said member, annular rotatable and non-rotatable friction braking elements disposed within said structure concentric with said axle, the non-rotatable element being secured to said structure against rotation, means removably secured to the end of said axle adjacent said structure and operatively connected to said rotatable element for turning said rotatable element with said assembly, said structure being so designed as to provide for application and removal of said braking elements to and from said structure and for applying and removing said means to and from said axle, and fluid pressure controlled means associated with said structure in concentric relation with said axle for controlling movement of said elements into and out of frictional engagement.

29. A brake mechanism for a wheel and axle assembly of a vehicle truck having a non-rotatable bearing member supported on the axle outside of a wheel of said assembly and resiliently supporting a truck frame, said mechanism comprising a supporting structure removably secured to said bearing member, annular rotatable and non-rotatable friction braking elements disposed within said structure concentric with said axle, the non-rotatable element being secured to said structure against rotation, removable means securing said rotatable element to rotate with the wheel adjacent said structure, said structure being so designed as to provide for application and removal of said braking elements to and from said structure and for applying and removing said removable means, and fluid pressure brake cylinder means associated with said structure in axial alignment with said assembly and operatively connected to said elements for controlling the operation thereof.

30. A brake mechanism for a wheel and axle assembly of a vehicle truck having a non-rotatable bearing member supported on the axle outside of a wheel of the assembly and resiliently supporting a truck frame, said mechanism comprising a supporting structure removably secured to said bearing member, a plurality of annular non-rotatable friction braking elements splined to said structure in axial alignment with said assembly and movable longitudinally of said assembly, a plurality of annular rotatable friction braking elements interleaved with said non-rotatable elements and having a splined connection to said assembly for rotation therewith, and a fluid pressure brake cylinder means removably secured to said structure axially and outside of the pile of said braking elements and operatively connected thereto for moving said braking elements into frictional braking engagement.

31. A brake mechanism for a wheel and axle assembly of a vehicle truck having a non-rotatable bearing member supported on the axle outside of a wheel of the assembly and resiliently supporting a truck frame, said mechanism comprising a supporting structure associated with said bearing member, a plurality of annular non-rotatable friction braking elements secured to said structure against rotation in axial alignment with said assembly and movable axially of said assembly, a plurality of annular rotatable friction braking elements interleaved with said non-rotatable elements, said non-rotatable brake elements and at least one of said rotatable brake elements being movable axially of said assembly, removable means securing said rotatable elements to rotate with said assembly, and fluid pressure brake cylinder means associated with said structure outside of the pile of said braking elements and operatively connected thereto for moving said braking elements into frictional braking engagement.

32. In a brake mechanism for a railway vehicle truck wheel and axle assembly, said assembly comprising a wheel, an axle secured for rotation with the wheel and a journal box carried by said axle and mounted in the frame of the truck, in combination, a brake element disposed in axial alignment with said axle and secured to said assembly for rotation therewith, a non-rotatable brake element disposed in axial alignment with said axle, and brake cylinder means operative to effect frictional braking interengagement of said elements to brake said assembly, said brake cylinder means being located outside of the vertical plane of said wheel and supported by the assembly independently of the truck frame.

33. In a brake mechanism for a railway vehicle truck wheel and axle assembly, said assembly comprising a wheel, an axle secured for rotation with the wheel and a journal box carried by said axle and mounted in the frame of the truck, in combination, a brake element disposed in axial alignment with said axle and secured to said assembly for rotation therewith, a non-rotatable brake element disposed in axial alignment with said axle, and brake cylinder means operative to effect frictional braking interengagement of said elements to brake said assembly, said brake cylinder means and non-rotatable brake element being located outside of the vertical plane of said wheel and supported by the assembly independently of the truck frame.

34. In a brake mechanism for a railway vehicle truck wheel and axle assembly, said assembly comprising a wheel, an axle secured for rotation with the wheel and a journal box carried by said axle and mounted in the frame of the truck, in combination, a brake element disposed in axial alignment with said axle and secured to said assembly for rotation therewith, a non-rotatable brake element disposed in axial alignment with said axle, and brake cylinder means operative to effect frictional braking interengagement of said elements to brake said assembly, said brake cylinder means and brake elements being located outside of the vertical plane of said wheel, the brake cylinder and non-rotatable brake element being supported by the assembly independently of the truck frame.

35. In a brake mechanism for a railway vehicle truck wheel and axle assembly, said assembly comprising a wheel, an axle secured for rotation with the wheel and a journal box carried by said axle and mounted in the frame of the truck, in combination, a brake element disposed in axial alignment with said axle and secured to said assembly for rotation therewith, a non-rotatable brake element disposed in axial alignment with said axle, and brake cylinder means operative to effect frictional braking interengagement of said elements to brake said assembly, said brake cylinder means being located outwardly beyond one end of said assembly.

36. In a brake mechanism for a railway vehicle truck wheel and axle assembly, said assembly comprising a wheel, an axle secured for rotation with the wheel and a journal box carried by said axle and mounted in the frame of the truck, in combination, a brake element disposed in axial alignment with said axle and secured to said assembly for rotation therewith, a non-rotatable brake element disposed in axial alignment with said axle, and brake cylinder means operative to effect frictional braking interengagement of said elements to brake said assembly, said brake cylinder means being located outboard of said journal box.

37. In a brake mechanism for a railway vehicle truck wheel and axle assembly, said assembly comprising a wheel, an axle secured for rotation with the wheel and a journal box carried by said axle and mounted in the frame of the truck, in combination, a brake element disposed in axial alignment with said axle and secured to said assembly for rotation therewith, a non-rotatable brake element disposed in axial alignment with said axle, and brake cylinder means operative to effect frictional braking interengagement of said elements to brake said assembly, said brake cylinder means being located outwardly beyond one end of said assembly and carried by the assembly.

38. In a brake mechanism for a railway vehicle truck comprising a side frame and a wheel and axle assembly upon which the side frame is carried, said side frame being located adjacent but outboard of a wheel of the assembly, in combination, rotatable and non-rotatable brake elements disposed concentrically with the axle of said assembly and being adapted to frictionally interengage to brake said assembly, and brake cylinder means located outboard of said side frame operative to effect the frictional interengagement of said brake elements.

39. In a brake mechanism for a railway vehicle truck comprising a side frame and a wheel and axle assembly upon which the side frame is carried, said side frame being located adjacent but outboard of a wheel of the assembly, in combination, rotatable and non-rotatable brake elements disposed concentrically with the axle of said assembly and being adapted to frictionally interengage to brake said assembly, and brake cylinder means operative to effect the interengagement of said brake elements, said brake cylinder means and said brake elements being located outboard of said side frame.

40. In a brake mechanism for a wheel and axle assembly of a railway vehicle truck, in combination, a journal box, a truck frame carried by said journal box and movable vertically relative to the wheel and axle assembly, rotatable and non-rotatable disks adapted to be moved axially into braking engagement with each other, the rotatable disk being secured for rotation with said wheel, means carried by said assembly for supporting the non-rotatable disk independently of said truck frame and interlocking with said truck frame for maintaining, independently of said journal box, the non-rotatable disk against rotation, and mechanism carried by said means for effecting the interengagement of said disks.

41. In a brake mechanism for a wheel and axle assembly of a railway vehicle truck, in combination, a journal box, a truck frame carried by said journal box and movable vertically relative to the wheel and axle assembly, a rotatable friction braking disk secured for rotation with said wheel, a non-rotatable friction disk adapted to be moved axially into friction braking engagement with said rotatable disk, means carried by said assembly for supporting the non-rotatable disk independently of said truck frame and interlocking with said truck frame for maintaining, independently of said journal box, the non-rotatable disk against rotation, and mechanism carried by said means for effecting movement of the non-rotatable disk into braking engagement with the rotatable disk.

42. A brake mechanism for a wheel and axle assembly of a railway vehicle truck having a journal box carried by said assembly and a truck frame mounted on said journal box, said mechanism comprising an annular rotatable friction braking element secured to rotate with one of the wheels of said assembly, an annular non-rotatable friction braking element adapted to be moved into frictional braking engagement with said rotatable braking element for braking said wheel, and a brake cylinder device supported at the outer end of said journal box and operatively connected to said non-rotatable element for controlling the operation thereof.

43. A brake mechanism for a wheel and axle assembly of a railway vehicle truck having a journal box carried by said assembly and a truck frame mounted on said journal box, said mechanism comprising an annular rotatable friction braking element secured to rotate with one of the wheels of said assembly, an annular non-rotatable friction braking element adapted to be moved into frictional braking engagement with said rotatable braking element for braking said wheel, a brake cylinder piston carried by said journal box at the outer end thereof, and pins operatively connecting said brake cylinder device to said non-rotatable element for controlling the operation thereof.

44. A brake mechanism for a wheel and axle assembly of a railway vehicle truck having a journal box carried by said assembly and a truck frame mounted on said journal box, said mechanism comprising an annular rotatable friction braking element secured to rotate with one of the wheels of said assembly, an annular non-rotatable friction braking element adapted to be moved into frictional braking engagement with said rotatable braking element for braking said wheel, a casing secured to the outer end of said journal box, and a brake cylinder piston in said casing operatively connected to said non-rotatable element for controlling the operation thereof.

45. A brake mechanism for a wheel and axle assembly of a railway vehicle truck having a journal box carried by said assembly and a truck frame mounted on said journal box, said mechanism comprising an annular rotatable friction braking element secured to rotate with one of the wheels of said assembly, an annular non-rotatable friction braking element adapted to be moved into frictional braking engagement with said rotatable braking element for braking said wheel, a brake cylinder piston carried by said journal box at the outer end thereof, and a plurality of pins spaced around said journal box and operatively connecting said piston to said non-rotatable element for controlling the operation thereof.

46. A brake mechanism for a wheel and axle assembly of a railway vehicle truck having a journal box carried by said assembly and a truck frame mounted on said journal box, said mechanism comprising an annular rotatable friction braking element secured to rotate with said assembly, an annular non-rotatable friction braking element disposed in concentric relation with said rotatable braking element, a brake cylinder piston associated with said journal box and connected to said non-rotatable element and adapted to be operated from a release position by fluid under pressure for moving said non-rotatable element into frictional braking engagement with said rotatable element for braking said assembly, spring means acting on said piston for moving same to said release position upon the release of fluid under pressure from said piston, and other spring means acting on said non-rotatable element for moving same out of engagement with said rotatable element upon movement of said brake cylinder piston to release position.

BURTON S. AIKMAN.